May 5, 1931.  R. C. CAMPBELL  1,803,380
FILTERING MATERIAL AND METHOD OF FILTERING SUGAR JUICES
Filed July 21, 1925
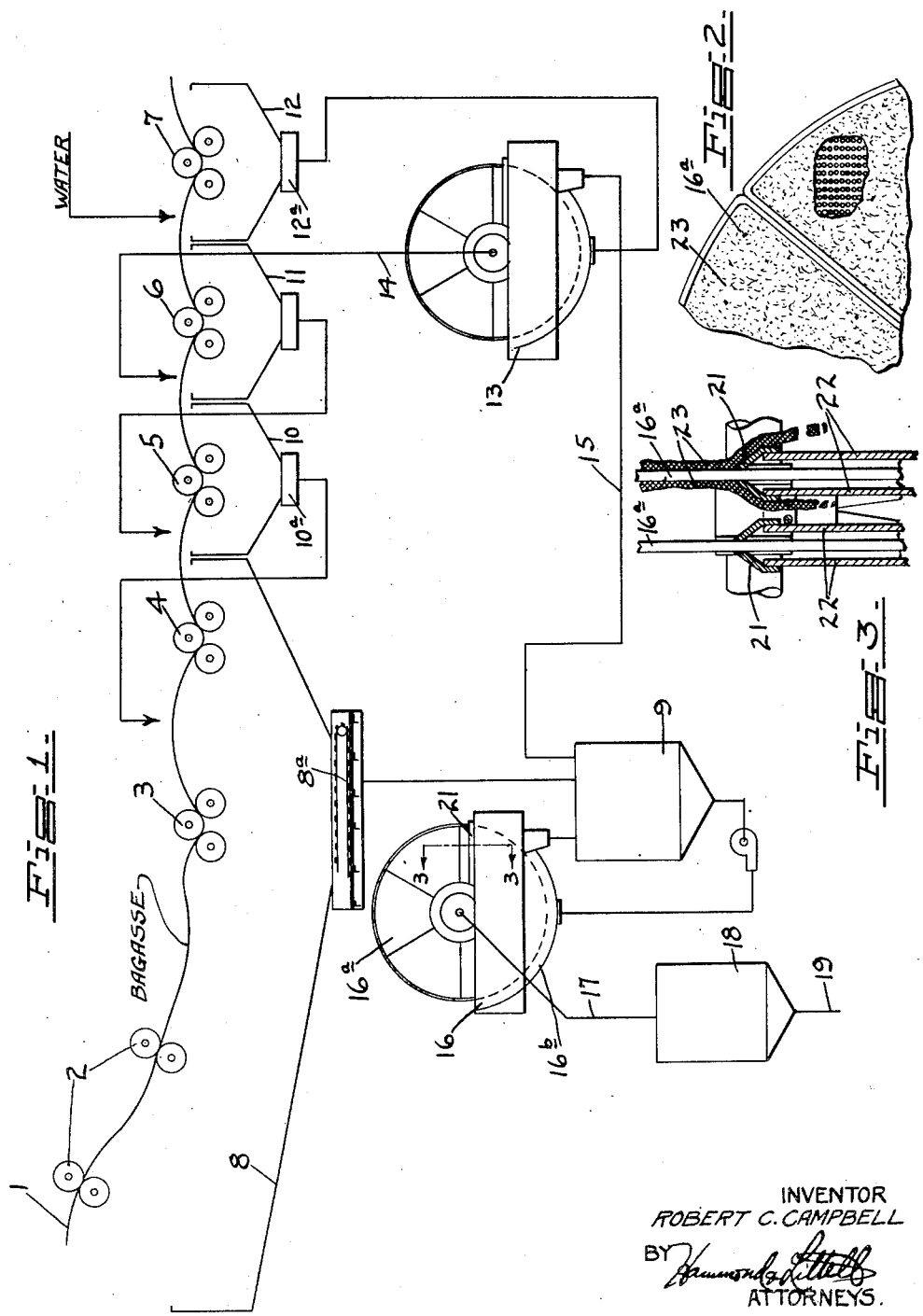
INVENTOR
ROBERT C. CAMPBELL
BY
ATTORNEYS.

Patented May 5, 1931

1,803,380

UNITED STATES PATENT OFFICE

ROBERT C. CAMPBELL, OF MILLBURN, NEW JERSEY, ASSIGNOR, BY MESNE ASSIGNMENTS, TO OLIVER UNITED FILTERS, INC., OF SAN FRANCISCO, CALIFORNIA, A CORPORATION OF NEVADA

FILTERING MATERIAL AND METHOD OF FILTERING SUGAR JUICES

Application filed July 21, 1925. Serial No. 44,975.

This invention relates to an improvement in filtering materials generally, and particularly in a process and means for improving the recovery of sugar from cane, beet and other sugar juices.

In the grinding of sugar cane for the production of sugar, sorghum, syrup and the like, it is customary to pass the cane through crushers which break and shred the cane, and then through a series of mills which further break up and masticate the cane fibers and squeeze the juice therefrom. The juice is collected in a series of troughs beneath the crushers and mills,—that from the crushers and the first mills being usually collected and after a series of treatment steps conveyed to the evaporators for the recovery of the sugar content, and that from the later mills being conveyed back in a counter-current to the path of the bagasse, eventually reaching the trough under the first mills. It is customary to provide the troughs under the mills with a perforated plate straining or screening medium over which an endless drag passes to remove the portions of cane stalk which lodge on the screen, to keep the perforations open, the solid material removed by the drag being deposited on the bagasse as it flows through the mill. It is impossible, however, to make these trough screens fine enough to remove all the solid material from the juices and at the same time keep them open so as to readily pass the juice therethrough, and the juices going to the liming vats or defecators and to the heaters, and the clarifiers contain a certain amount of suspended solids which impart a muddy color to the juice and some of which, when treated in the defecators and heated, go into solution, causing a darkening of the juice and a reduction in the purity of the sugar. Various attempts have been made to eliminate these solids before the liming operation. Ordinary filtration has been found impractical, however, for the reason that the sugar juices on the surface of the fabric, cloth, or other rough surfaced filter leaves very quickly cake and stop the pores, which necessitates too frequent dismantling of the filter for thorough washing and cleaning for economical use of ordinary filters.

The use of a smooth surfaced filtering medium, such as perforated plate, smooth rolled screen, or the like, of fine dimensions as described in my copending application Ser. No. 28,549, filed May 7, 1925, is not practical upon juices as they come from the first mill, because the suspended solids contain a large percentage of small sections of cane fibers which do not form a cake on the surface of the filter but are quickly sucked into the holes of the perforated plate, where they cannot be removed by the cake removers or scrapers, and stop the flow of filtrate therethrough. The use of kieselguhr, filter-cell, or other filter aids to assist in gathering up the solids from the liquid and in forming a filter cake, is not ordinarily practical, because of the cost thereof. I have discovered, however, that the use of the pith from the cane stalks forms a very efficient filtering medium, and as it is otherwise a substantially unused by-product in the sugar recovery process, it may be utilized for the filtration of these first juices without substantially increasing the cost of the filtration.

The pith may be separated from the bagasse in a dry state and used. In its dry condition, however, it is difficult to mix it with the juices to be filtered until it has been boiled in water to expel the air from the pores thereof and has become water-logged, in which condition it will mix readily with the juices. I have found, however, that the juices from the latter mills contain a sufficiently high percentage of pith to form a satisfactory filter cake, which, in its wet condition, can be mixed directly with the juices from the first mill to cause the formation of a filter cake upon the perforated plate filter medium of a continuous filter, which will effectively remove all the solids from the juices from the first mill, which retains its porosity, and does not become clogged or permit clogging of the perforations in the filter medium and which will strip easily and cleanly from the surface of the smooth filtering medium.

It is an object, therefore, of my invention to provide a method and means for filtering sugar juices which will permit the economical removal of the suspended solids from the juices caught from the mills before the liming or defecating, heating or other treatment operations.

Another object of my invention is to provide a new type of filter aid or filtering material which will be of a high degree of imperviousness to solids and porosity to liquids, of very light weight, and cheap.

Another object of the invention is to provide a practical method of filtering screened sugar juices from the mill troughs and to provide a means for supplying the filter aid necessary to carry out the process from otherwise waste materials of the sugar mill.

Various other objects and advantages will appear as the description of the invention proceeds.

Referring now to the drawings which illustrate in diagrammatic form one of the various forms of embodiment of my invention,—

Fig. 1 is a diagrammatic layout of the conventional sugar mill showing my invention used therein.

Fig. 2 is an enlarged side view of one of the filter surfaces used in my invention.

Fig. 3 is a sectional view approximately on the line 3—3 of Fig. 1, showing the filter aid on the filter surfaces and the means for removing it from the filter surfaces.

In the diagrammatic layout of the sugar mill, 1 indicates the blanket of cane or bagasse as it passes through the mill, 2 indicates the crushers which break the stalks upon their first entry into the mill, 3 and 4 indicate the first and second mills which further break and squeeze out a portion of the juice from the cane stalks, 5 illustrates the third mill, 6 illustrates the fourth mill, 7 the fifth mill, etc., it being understood that there may be more or less than five mills used without affecting the operation or principles of my invention.

A trough 8 is located so as to catch the juices from the crushers 2 and from the mills 3 and 4 and to discharge this juice after passing through the drag screen 8a into a feed tank or reservoir 9. A trough 10 under the mill 5 receives the juices from this mill and discharges them after passing through the screen 10a in position where they can be pumped back on the bagasse passing between the preceding mills 3 and 4. A similar trough 11 is located under the mill 6 from which the juices are pumped back onto the bagasse before it passes through the mill 5, and 12 indicates a similar trough provided with a screen 12a for receiving the juices from the last mill, in this instance, 7. According to my process, the screened juices from the latter, or preferably from the last mill, which I have discovered contain a sufficiently large percentage of pith to form a suitable filter cake, are conveyed to a filter 13 which is preferably of the continuous type, although it may be of the intermittent or other type in which a filter cake containing a high percentage of pith is formed upon the surface of the filter, while the filtrate is returned by means of a conduit 14 to the bagasse passing through the next preceding mill. The filter cake, consisting mostly of pith from the cane stalks, which is preferably continuously removed from the filtering surfaces of the filter 13, is conveyed while still wet by any suitable conveyor 15 to the reservoir 9, where it is mixed with the first mill juices coming from the trough 8. The juices from the reservoir 9, to which has been added the filter cake from the filter 13, or, if desired, a suitable portion of pith recovered by any other source, are then pumped to a continuous filter 16, the filtering surfaces of which are of fine mesh perforated plate, smooth rolled screen, or other hard smooth-surfaced material which is perforated to permit the flow of liquid but impervious to solids, as described in my co-pending application above referred to. In this filter, the pith contained in the reservoir 9 very quickly forms a filter cake upon the surface of the filter leaves when the leaves are immersed in the sugar juices in the tank of the filter, which, on account of the nature of the pith, is highly porous to liquids but at the same time is substantially impervious to solid materials, so that the filtrate flowing through this pith cake is substantially free from the objectionable solids heretofore discussed. This clear filtrate is conveyed through a conduit 17 to a measuring vat 18 and from there through conduit 19 to the liming vats or defecators, thence to the heaters, through the clarifiers, and thence to the evaporators, as in the usual practice. The filter 16 is preferably located above the reservoir 9, so that the filter cake which is scraped from the filter surfaces during each cycle of operation by the scrapers 21 may be permitted to drop back between the edges 22 of the filter tank into the reservoir 9 and continue in circulation.

The leaves 16a of the filter 16 are covered with the smooth, hard filtering surface, which preferably consists of perforated brass plates, as indicated in Fig. 2, containing about 625 perforations per square inch of about .020 inch in diameter. These leaves rotate slowly through the tank 16b and the filtrate is drawn by suction through the axle of the filter into any suitable reservoir communicating with the conduit 17, as indicated diagrammatically in Fig. 1. As the leaves 16a enter the tank, the cake 23, formed by the preceding cycle, is removed by the scrapers 21 on the edge 22 of the tank, and permitted to fall downward into the tank 9 or upon the conveyor 20.

If desired, the filter 13 may be eliminated from the system by pumping the juice from one of the latter mills through the conduit 15a, direct to the filter 16, which may be operated for a short time solely to collect a pith filter cake from the latter juices, the dilute filtrate being pumped back on the bagasse. The collected filter cake from the filter 16 may then be mixed with the juices in the reservoir 9 and used in the filter 16, as described, to remove the fine solids from said juices.

By removing all the suspended impurities from the sugar juices coming from the mills before these juices are subjected to treatment, I attain first an economy in the amount of treatment materials used in the defecators and a reduction in the amount of solids to be handled in the settling tanks or clarifiers, and, second, a lighter color in the juices and a reduction in the percentage of impurities in the juices going to the evaporators.

The filter cake is substantially completely removed from the surface of the perforated plate filter medium during each revolution of the filter by the scrapers 21 which contact with the sides of the perforated plates, so that no dismantling of the filter is necessary to clean the filter surfaces, and as the composition of the cake is the same as the bagasse, no problem is presented in disposing of it.

My discovery and application of the use of pith as a filter medium is not limited to any particular field of filtration. As a filter aid pith from cane stalks, corn stalks, and other medullary plants may be used in various fields outside that of sugar recovery. In many places pith may be used to replace kieselguhr, clays, fuller's earth, carbon and other substances, as a filter or filter aid. It is quite impervious to solids, while being sufficiently porous to permit liquids to flow readily therethrough, it is of light weight, is easily handled, and can be cheaply secured in almost unlimited amounts from otherwise waste products.

Various types of continuous filters may be used in lieu of the rotating leaf type filter shown in my preferred system, and details of the filter and system may be changed without departing from the spirit of my invention or the scope of the appended claims.

I claim:

1. The method of improving the purity of cane sugar by filtering the sugar juices as they come from the screens of the crushing mills and before defecation or heating of the juices, in a continuous filter provided with a perforated plate filtering medium which consists in extracting from said juices a filter aid naturally occurring therein, adding said filter aid to said juices to prevent plugging of the perforations of said plate by the shreds of the cane stalks, then drawing the juices through said filter and collecting the filter aid and solids on the filter medium, and completely removing the collected solids and filter aid from the surface of said filter medium during each cycle of filter operation.

2. The method of improving the purity of cane sugar by filtering the sugar juices as they come from the screens of the crushing mills and before defecation or heating of the juices, which consists in extracting from said juices a filter aid naturally occurring therein, continuously passing the juices through a continuous filter, adding said filter aid to said juices before they reach said filter to prevent plugging of the filter medium, and completely cleaning the solids and filter aid from said filter medium once during each cycle of filter operation.

3. The method of improving the purity of cane sugar by filtering the sugar juices as they come from the screens of the crushing mills and before defecation or heating of the juices, which consists in extracting from said juices a filter aid naturally occurring therein, continuously passing the juices through a continuous filter, adding said filter aid to said juices before they reach said filter to prevent plugging of the filter medium, completely cleaning the solids and filter aid from said filter medium once during each cycle of filter operation, and recirculating the filter aid through said filter.

4. The method of improving the purity of cane sugar by filtering the sugar juices as they come from the screens of the crushing mills and before defecation or heating of the juices which consists in extracting from said juices a substance naturally occurring therein and capable of filtering same, and causing said juices to pass through said substance to be filtered thereby.

5. The method of improving the purity of cane sugar by filtering the sugar juices as they come from the screens of the crushing mills and before defecation or heating of the juices which consists in extracting from said juices the pith of the cane stalks occurring therein, continuously collecting said pith and causing said juices to be filtered thereby so that suspended impurities in said juices are removed by said pith.

6. The method of improving the purity of cane sugar by filtering the sugar juices as they come from the screens of the crushing mills and before defecation or heating of the juices which consists in extracting from said juices a filter aid naturally occurring therein, continuously passing the juices through a continuous filter including perforated brass plates, adding said filter aid to said juices before they reach said filter, and causing the juices to be strained through said filter aid and said plates to remove solid substances suspended in said juices.

In testimony whereof I have affixed my signature to this specification.

ROBERT C. CAMPBELL.